United States Patent [19]
Rao

[11] Patent Number: 5,631,981
[45] Date of Patent: May 20, 1997

[54] BITMAP REGISTRATION BY GRADIENT DESCENT

[75] Inventor: Arun Rao, Novato, Calif.

[73] Assignee: Eastman Kodak Company, Rochester, N.Y.

[21] Appl. No.: 614,446

[22] Filed: Mar. 12, 1996

Related U.S. Application Data

[63] Continuation of Ser. No. 181,287, Jan. 13, 1994, abandoned.
[51] Int. Cl.$^6$ .................................................. G06K 9/64
[52] U.S. Cl. ...................... 382/278; 382/276; 382/295; 324/309
[58] Field of Search ............................ 382/201, 209, 382/276, 205, 278, 295, 141, 218, 197; 324/309

[56] References Cited

U.S. PATENT DOCUMENTS

| | | | |
|---|---|---|---|
| 4,457,015 | 6/1984 | Nally et al. | 382/45 |
| 4,543,660 | 9/1985 | Maeda | 382/41 |
| 4,581,762 | 4/1986 | Lapidus et al. | 382/23 |
| 4,658,428 | 4/1987 | Bedros et al. | 382/30 |
| 4,680,627 | 7/1987 | Sase et al. | 358/101 |
| 4,703,350 | 10/1987 | Hinman | 358/133 |
| 4,849,914 | 7/1989 | Medioni et al. | 382/8 |
| 4,905,296 | 2/1990 | Nishihara | 382/42 |
| 4,941,185 | 7/1990 | Reed | 382/41 |
| 4,993,075 | 2/1991 | Sekihara et al. | 382/6 |
| 5,022,089 | 6/1991 | Wilson | 382/44 |
| 5,052,043 | 9/1991 | Gaborski | 382/14 |
| 5,091,966 | 2/1992 | Bloomberg et al. | 382/21 |
| 5,093,653 | 3/1992 | Ikehira | 340/727 |
| 5,105,468 | 4/1992 | Guyon et al. | 382/14 |
| 5,161,204 | 11/1992 | Hutcheson et al. | 382/16 |
| 5,164,997 | 11/1992 | Kumagai | 382/46 |
| 5,233,670 | 8/1993 | Dufour et al. | 382/41 |

FOREIGN PATENT DOCUMENTS

| | | | |
|---|---|---|---|
| 0220110A | 4/1987 | European Pat. Off. | G06K 9/64 |
| 0220110A2 | 4/1987 | European Pat. Off. | G06K 9/64 |
| 60-246188 | 12/1985 | Japan | H04N 7/18 |
| 61-6776 | 1/1986 | Japan | G06K 9/00 |
| 62-28882 | 2/1987 | Japan | G06K 9/32 |
| 2035551 | 6/1980 | United Kingdom | G07D 7/00 |

OTHER PUBLICATIONS

NASA Tech Briefs, Fall 1980 "Real–Time Image Enhancement", pp. 2878–288.

IEEE Transactions of Signal Processing, vol. 39, No. 9, Sep. 1991, "Analysis of Multichannel Narrow–Band Filters for Image Texture Segmentation" by Alan C. Bovik, pp. 2025–2043.

"Image Texture Processing and Data Integration for Surface Pattern Discrimination" by Derek R. Peddle et al., Photogrammetric Engineering & Remote Sensing, vol. 57, No. 4, Apr. 1991, pp. 413–420.

"Use of Texture Operators in Segmentation", by Charles A. harlow et al., Optical Engineering, Nov. 1986, vol. 25, No. 11, pp. 1200–1206.

"Multidimensional Orientation Estimation with Applications to Texture Analysis and Optical Flow" by Josef Bigun, et al., IEEE Transactions on Pattern Analysis and Machine Intelligence, vol. 13, No. 8, Aug. 1991, pp. 775–790.

(List continued on next page.)

*Primary Examiner*—Jose L. Couso
*Assistant Examiner*—Anh Hong Do
*Attorney, Agent, or Firm*—Peyton C. Watkins

[57] ABSTRACT

A template useful in registering an incoming bitmapped image with a master bitmapped image is created by convolving the master with a Gaussian function and computing the gradient of the resulting scalar field. According to the invention, the incoming image is iteratively moved with respect to the template in response to the gradient of the scalar field formed by the convolution operation, i.e., the direction of adjustment is a function of the gradient of the scalar field formed by the convolution operation used to create the template. According to one embodiment of the invention, the registration process is terminated when the error between the master and the image is below a predefined threshold.

19 Claims, 4 Drawing Sheets

OTHER PUBLICATIONS

"Correspondence" by B. S. Manjunath et al., IEEE Transactions on Pattern Analysis and Machine Intelligence, vol. 13, No. 5, May 1991, pp. 478–482.

"Image Registration: Similarity Measure and Preprocessing Method Comparisons" by Martin Svedlow et al., IEEE Transactions on Aerospace and Electronic Systems, vol. AES–14, No. 1, Jan. 1978, pp. 141–150.

An article entitled "Image Registration: Similarity Measure and Preprocessing Method Comparisons", by Svedlow et al., published by IEEE Jan. 1978.

An article entitled "Unsupervised Texture Segmentation Using Markov Random Field Models", by Manjunath et al., published by IEEE May 1991.

An article entitled "Multidimensional Orientation Estimation With Applications To Texture Analysis and Optical Flow", by Bigun et al., published by IEEE Aug. 1991.

An article entitled "Use of Texture Operators in Segmentation", by Harlow et al., published in Optical Engineering Nov. 1986.

An article entitles "Image Texture Processing and Data Integration for Surface Pattern Discrimination", by Peddle et al., published in Photogrammetric Engineering and Remote Sensing Apr. 1991.

An article entitled "Analysis of Multichannel Narrow–Band Filters for Image Text Segmentation", by Bovik, published by IEEE Sep. 1991.

FIG. 1
(Prior Art)

Form 1040

*FIG. 2A*

Form 1040

BITMAP REGISTRATION BY GRADIENT DESCENT

This is a continuation of application Ser. No. 08/181,287, filed Jan. 13, 1994, now abandoned.

BACKGROUND OF THE INVENTION

1. Field of the Invention

The present invention relates generally to methods and apparatus for performing bitmapped image registration (alignment). Such methods and apparatus may, for example, be used to register an incoming image (such as an image scanned into an image processing system via a paper scanner) with one of a set of reference bitmapped images (also referred to herein as "master" bitmapped images), accessible to the system.

More particularly, the invention relates to methods and apparatus for performing bitmapped image registration utilizing pre-computed gradients, based on which an incoming image may accurately be registered with a the master, in a computationally efficient manner.

2. Description of the Related Art

In the field of pattern recognition and document understanding, it is frequently necessary to identify a given bitmapped image as being similar to (or the same as) one of a set of master bitmapped images.

A straightforward pixel-by-pixel comparison is usually not practical because the image to be identified may not be registered accurately with the master. This can occur, for example, because of differences in document positioning during scanning. This misregistration is also a problem when specific regions in a document need to be read for further processing.

One well known approach to solving the image registration problem uses the principal axis transform, in which the distance between the centers of mass of the master and the image to be registered is computed.

An example of prior art methods and apparatus for solving the image registration problem utilizing a principal axis transform is set forth in U.S. Pat. No. 5,022,089, to Wilson, issued Jun. 4, 1991.

In particular, Wilson teaches an algorithmic based method and apparatus that uses a digital image gray level centroid ("center of gravity") to compute the center locations of symmetric crosshair register marks.

The difficulty with methods that attempt to solve registration problems utilizing principal axis transforms is that they are computationally complex expending computing resources unnecessarily, and they are easily defeated by extraneous material in the image which make the center of mass incorrect.

Accordingly, it would be desirable to provide methods and apparatus for solving bitmapped image registration problems in a manner that does not require the use of principal axis transforms or other processing techniques that are sensitive to extraneous material in the image being processed (registered).

In addition to the teachings of Wilson, many other techniques for solving image registration problems in image processing, character recognition and object alignment systems (all typically operating under software control), are well known by those skilled in the art.

By way of example, to illustrate the state of the art, reference is made to the teachings of Kumagai, set forth in U.S. Pat. No. 5,164,997, issued Nov. 17, 1992; U.S. Pat. No. 5,161,204 issued to Hutcheson et al., on Nov. 3, 1992; U.S. Pat. No. 4,905,296 issued to Nishihara on Feb. 27, 1990; U.S. Pat. No. 4,457,015 issued to Nally et al., on Jun. 26, 1984; and U.S. Pat. No. 4,680,627, issued to Sase et al., on Jul. 14, 1987.

U.S. Pat. No. 5,164,997 patent to Kumagai addresses the bitmapped image registration problem by using pixels of closed contours to align images. A series of pixels is selected from along a contour in each image and pixel series are compared to determine a degree of concurrence. One series is then shifted by one pixel relative to the other, and concurrence is again determined after the shift. The series are shifted repeatedly until all shifts have been measured. The shift distance that results in the maximum concurrence is selected as the measure of the amount of rotation needed to align the images.

After rotational alignment, one image is displaced by one pixel relative to the other and the displace images are compared to determine a degree of coincidence. After the images have been rotated and displaced, they are aligned.

Those skilled in the art will recognize that the teachings of Kumagai require the use of a computationally intensive processes related to contour extraction and data manipulation, along with all of the aforementioned tests for concurrence and coincidence. Furthermore, the accuracy of the technique taught by Kumagai depends on the accuracy of extracted contours.

Accordingly, it would desirable to provide methods and apparatus for solving bitmapped image registration problems accurately in a manner that does not require the extraction or manipulation of image contour data, and which does not rely upon the accuracy of contour data.

U.S. Pat. No. 5,161,204 to Hutcheson et al., relates to methods and apparatus which perform pattern recognition under software control. The pattern recognition system employs feature template regions and feature vectors. A Gaussian distribution of fixed intensities may be applied along with a gradient decent or steepest decent method which is used to track the convergence of each member of a training set of feature vectors.

The teachings of Hutcheson et al., however, require the use of a neural network to recognize two dimensional input images which are sufficiently similar to a database of previously stored two dimensional images (masters).

Accordingly, it would be desirable to provide methods and apparatus for solving bitmapped image registration problems in a manner that does not require without requiring the use of neural networks.

With respect to the remaining references referred to hereinabove, which illustrate the state of the art, U.S. Pat. No. 4,905,296 to Nishihara relates to an image processing system that employs a Gaussian Convolution operator to recognize shapes; U.S. Pat. No. 4,457,015 to Nally et al., relates to a character recognition system that employs template matching techniques for character recognition; and U.S. Pat. No. 4,680,627, to Sase et al., relates to a pattern checking apparatus wherein registration patterns of two different images are accurately compared using binary bit serial signals.

Those skilled in the art will recognize however, that none of the approaches set forth in the state of the art illustrative patents described hereinabove, teaches, claims or even suggests registering a bitmapped image against a master by gradient decent. Such an approach to bitmapped image registration, as will become clear with reference to the detailed description of the invention set forth hereinafter, provides a registration technique which is computationally efficient, insensitive to extra material in image to be registered, and is a simple process to use that may be applied to all bitmapped, monochrome images.

SUMMARY OF THE INVENTION

Accordingly, it is a general object of the invention to provide methods and apparatus for registering bitmapped images with a master in a computationally efficient and accurate manner.

Specifically, it is an object of the invention to provide methods and apparatus for registering bitmapped images with a master that are insensitive to extraneous material in the image being processed (registered); and which do not require the computation of principal axis transforms.

Furthermore, it is an object of the invention to provide methods and apparatus for registering bitmapped images with a master that do not require the extraction and manipulation of contour data.

Still further, it is an object of the invention to provide methods and apparatus for registering bitmapped images with a master that do not require the use of neural networks for pattern recognition.

Further yet, it is an object of the invention to provide methods and apparatus for registering bitmapped images with a master using precomputed gradients, based on which an incoming image is registered with the master.

Still another object of the present invention is to provide methods and apparatus for registering bitmapped images in image processing systems, registering bitmapped character representations in character recognition systems and aligning objects in object position adjustment systems; reliably, repeatedly and automatically.

According to the invention, a template useful in registering an incoming bitmapped image with a master bitmapped image is created by convolving the master with a Gaussian function and computing the gradient of the resulting scalar field.

Furthermore, according to the invention, the incoming image is iteratively moved with respect to the template in response to the gradient of the scalar field formed by the convolution operation, i.e., the direction of adjustment is a function of the gradient of the scalar field formed by the convolution operation used to create the template.

According to one embodiment of the invention, the registration process is terminated when the error between the master and the image is below a predefined threshold.

According to one aspect of the invention, a method for registering bitmapped images may be characterized as comprising the steps of: (a) creating a template from a master bitmapped image by convolving the master with a Gaussian function and computing the gradient of the resulting scalar field; and (b) iteratively adjusting the position of an image to be registered, with respect to the template, where the direction of adjustment is a function of the gradient of the scalar field formed by the convolution operation used to create the template.

The invention may be alternatively characterized as a method for registering bitmapped images utilizing an image processing system, comprising the steps of: (a) inputting a master bitmapped image to the image processing system; (b) creating a template from the master by convolving the master with a Gaussian function and computing the gradient of the resulting scalar field; (c) inputting an image to be registered with respect to the master into the image processing system; and (d) iteratively adjusting the position of the image to be registered, with respect to the template, where the direction of adjustment is a function of the gradient of the scalar field formed by the convolution operation used to create the template.

A further alternate characterization of the invention is that of a method for registering bitmapped images with corresponding master bitmapped images, comprising the steps of: (a) constructing a registration gradient template from a master by applying a convolution and gradient operation thereto; (b) computing the vector sum of all vectors in the gradient template at each black pixel on the image to be registered with said master; and (c) adjusting the position of the image to be registered by one pixel in the direction of the vector sum computed at step (b).

According to yet another aspect of the invention a method for registering bitmapped images utilizing a digital computer comprises the steps of: (a) providing the computer with a template created from a master bitmapped image utilizing a convolution operation; and (b) utilizing said computer to iteratively adjust the position of an image to be registered, with respect to the template, where the direction of adjustment is a function of the gradient of the scalar field formed by the convolution operation used to create the template.

The invention contemplates alternative (not necessarily exclusive) mechanisms for terminating the registration process that include, without limitation, terminating the registration process whenever the alignment error between the master and image to be registered is below a predetermined threshold; terminating the registration process whenever the number of iterations performed at the aforementioned step of iteratively adjusting exceeds a predetermined threshold value; and terminating the registration process whenever the same point is visited twice as a result of performing the step of iteratively adjusting.

Further yet, the invention contemplates apparatus that, with the aid of a digital computer, is capable of registering an incoming bitmapped image with a master bitmapped image, using a template created from the master by convolving the master with a Gaussian function and computing the gradient of the resulting scalar field, comprising: (a) means for providing the incoming bitmapped image to the computer; and (b) means for iteratively adjusting the position of the incoming bitmapped image, with respect to the template, where the direction of adjustment is a function of the gradient of the scalar field formed by the convolution operation used to create the template.

Still further, the invention may be alternatively characterized as an image processing system for aligning an incoming bitmapped image with a master bitmapped image; a character recognition system operative to align an incoming bitmapped image representing a character with a master bitmapped image representing the character; or a position adjustment system for aligning an incoming bitmapped representation of an object with a master bitmapped representation of the object, comprising: (a) registration means including: (a1) means for creating a registration gradient template from the master by applying a convolution and gradient operation thereto; (a2) means for computing the vector sum of all vectors in the registration gradient template at each black pixel on the incoming bitmapped image (or representation of an object); and (a3) means for adjusting the position of the incoming bitmapped image by one pixel in the direction of the vector sum computed by the means for computing; and (b) means for terminating the registration process.

The invention features the provision of methods and apparatus which are able to register bitmapped images in a computationally efficient manner which conserves computing resources. Furthermore, the methods and apparatus contemplated by the invention are insensitive to extraneous material contained in image to be registered; are simple to use; and may be applied to all bitmapped, monochrome images.

Still further, the invention features the ability to reliably, repeatedly and automatically align images, characters and objects, etc., in the aforementioned computationally efficient manner.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

Figure 1:
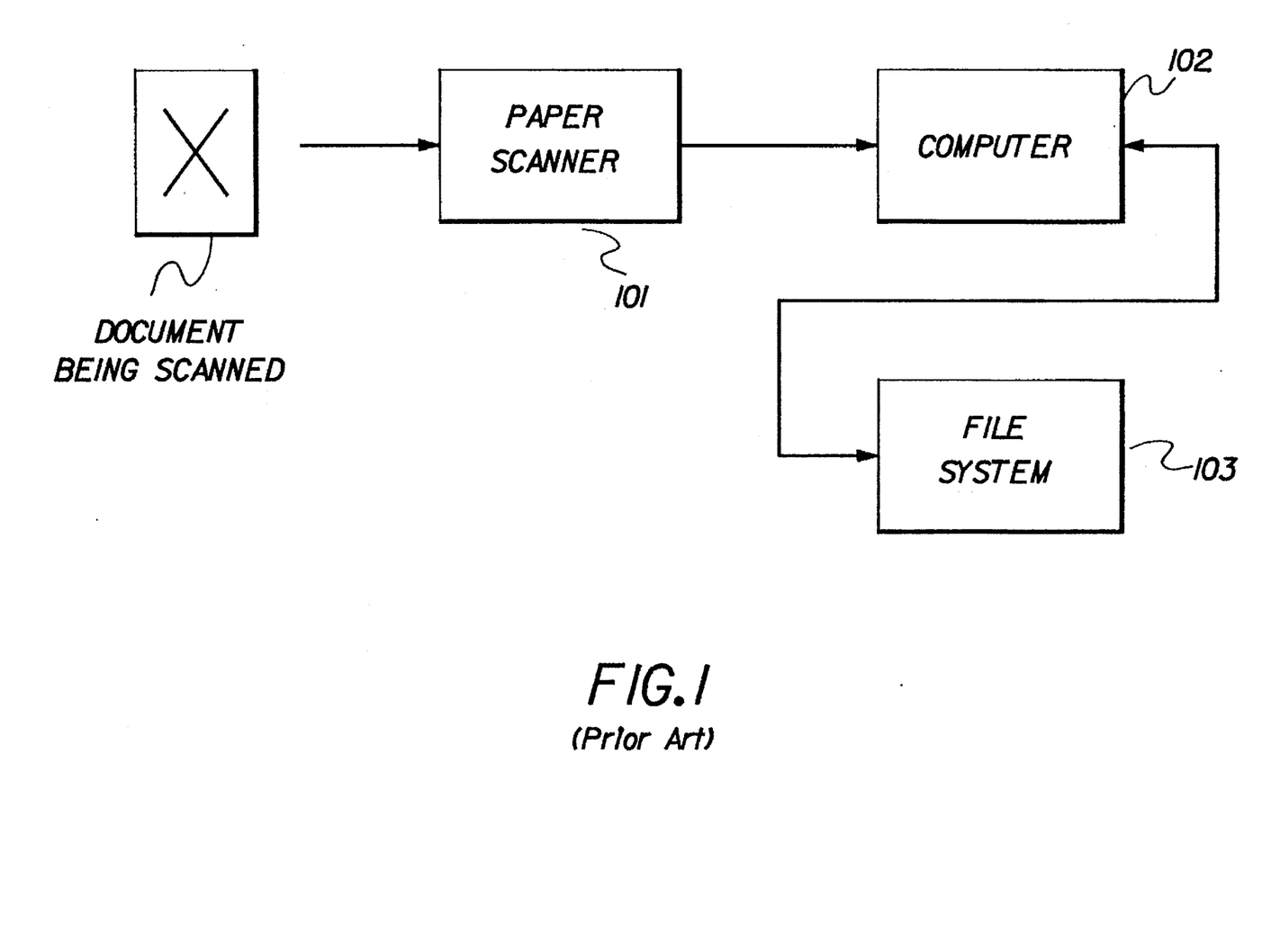
FIG. 1 depicts, in block diagram form, an exemplary prior art image processing system in which the present invention may be advantageously practiced.

Reference should now be made to FIG. 1 which depicts in block diagram form, as indicated hereinabove, an exemplary prior art image processing system in which the present invention may be advantageously practiced.

In particular, FIG. 1 depicts an image processing system that includes a paper scanner 101, which serves as an illustrative device for inputting an image; coupled to a programmable digital computer 102; which in turn is shown coupled to a file system 103 associated with computer 102.

The image input to computer 102 (also referred to herein as the "incoming" image) via scanner 101, may be aligned (registered) with a master stored in (or otherwise accessible to) computer 102, when (for example), computer 102 is programmed to transform the digital signals in the input unregistered digital record(s) created by scanner 101, into signals which represent registered digital records, using the teachings of the invention set forth hereinafter.

The exemplary image processing configuration depicted in FIG. 1, which is suitable for practicing the present invention, may be realized using all commercially available devices that are well known to those skilled in the art.

For example, Kodak's Image Link 923 Paper Scanner may be used to perform the function of scanner 101, i.e., to generate the digital data sets which are processed by the methods and apparatus contemplated by the invention.

An example of a suitable programmable digital computing systems (digital computer 102 in FIG. 1) which may be utilized to practice the invention, when programmed in accordance with the teachings of the invention as set forth hereinafter, is the commercially available Sun Sparcstation IPC workstation.

The file system (and/or output devices) that may be used to realize the functions of device 103 shown in FIG. 1 are also well known to those skilled in the art. These devices include the many commercially available memory devices (for a file system realization), which may be associated with (or included in) the system within which computer 102 located; and printers, cathode ray tube display devices, etc., that are compatible with computer 102.

Reference should now be made to FIGS. 2A–2B, 3, 4 and 5 for the remainder of the detailed description of the invention being set forth herein.

Figure 2A:
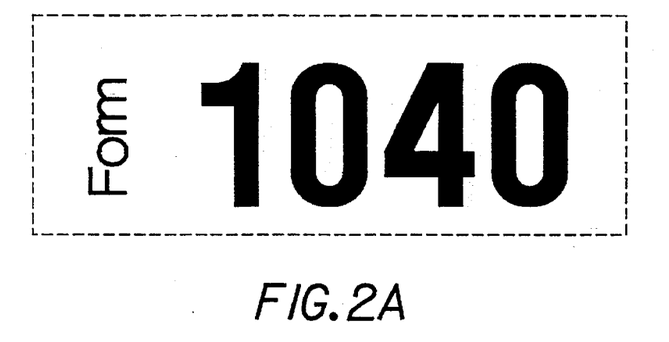
FIG. 2A and FIG. 2B illustrate two different bitmapped images, both of which are regions of a digitized Internal Revenue Service form 1040. The image depicted in FIG. 2A is referred to herein as the "reference" image (also referred to as the "master"), and the image depicted in FIG. 2B is referred to herein as the "incoming" image (i.e., the image to be registered with the master).
Figure 2B:
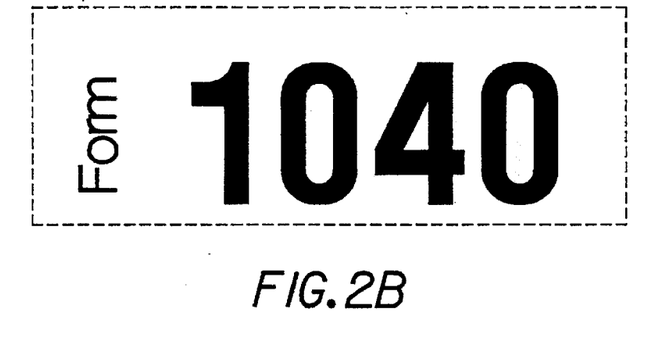

FIG. 2A and FIG. 2B illustrate two different bitmapped images, both of which are regions of a digitized Internal Revenue Service form 1040. As indicated hereinbefore, the image depicted in FIG. 2A is referred to herein as the "reference" or "master" bitmapped image; while the image depicted in FIG. 2B is referred to hereinafter as the "incoming" bitmapped image (i.e., the image to be registered with the master).

The registration technique contemplated by the invention will be explained with reference to the specific example of performing form identification, using the forms depicted in FIG. 2A and FIG. 2B. Those skilled in the art will readily appreciate that the invention has applications beyond form identification, as indicated elsewhere herein, and that the form identification example is being presented herein only for the sake of illustrating the principles of the invention.

The images depicted in FIG. 2A and FIG. 2B are (for the purpose in question) identical, but a pixel-by-pixel comparison yields a large error because the two images are not registered with respect to each other. In other words, even though the two images have the same dimensions, the corresponding points of one image are not at the same location.

According to the invention, having assumed that the image depicted in FIG. 2A is the master and FIG. 2B is the image to be registered, a template is first created from the master by a convolution and gradient operation.

The master is convolved with a Gaussian function given by:

$$f(x,y) = (-e)^{(x^2+y^2)/(sigma)^2}.$$

where sigma is the standard deviation of the Gaussian.

Figure 3:
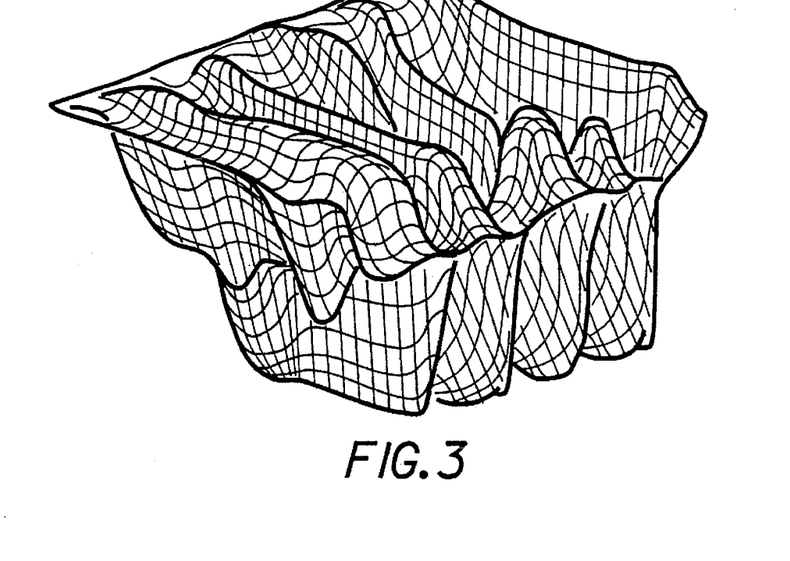
FIG. 3 depicts the result of the convolution of the master depicted in FIG. 2a with a Gaussian function.

The result of this convolution is depicted in FIG. 3, which illustrates a two-dimensional grid of real values.

According to the invention, the gradient of this scalar field is then computed and constitutes the template which is used for registration.

Figure 4:
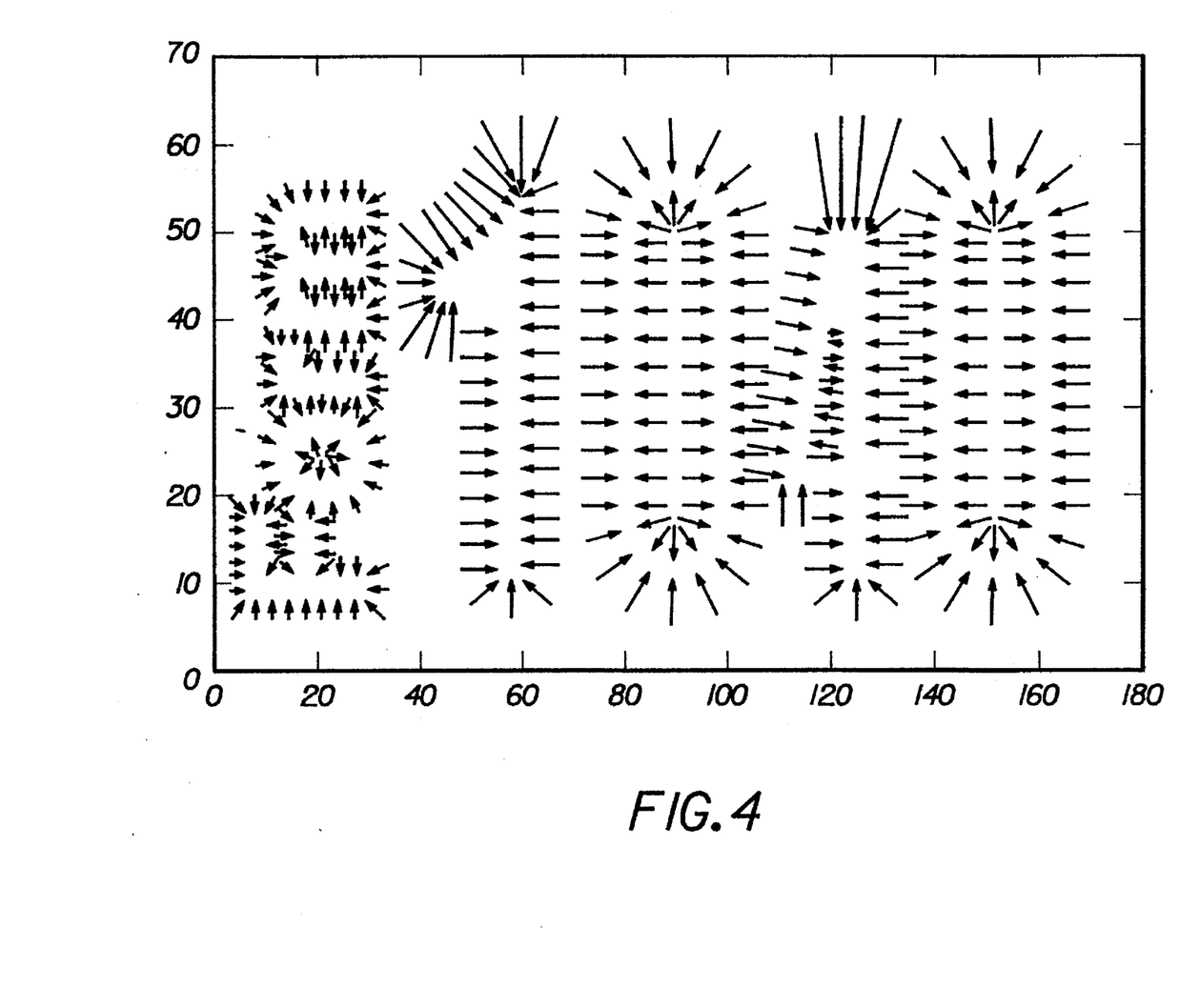
FIG. 4 depicts a quiver plot of the gradient of the scalar field depicted in FIG. 3.

As indicated hereinabove, a quiver plot of the gradient of the scalar field depicted in FIG. 3 is illustrated in FIG. 4.

Figure 5:
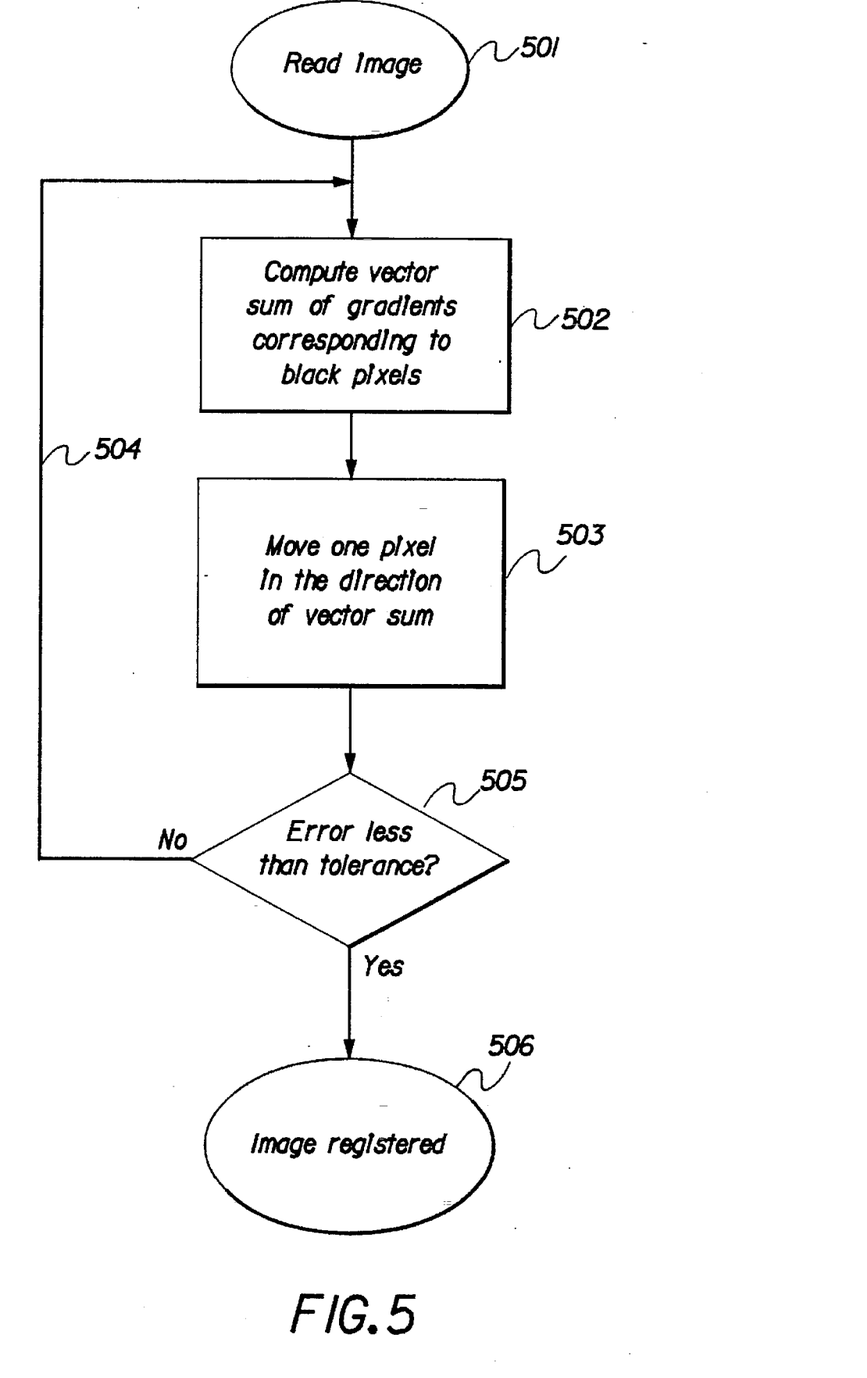
FIG. 5 depicts in the form of a flowchart a set of illustrative steps which may be used to implement the registration process contemplated by one aspect of the invention.

Reference should now be made to FIG. 5 which depicts, in the form of a flowchart, a set of illustrative steps which may be used to implement the registration process contemplated by one aspect of the invention.

It is assumed that the template referred to hereinabove (the quiver plot of which is depicted in FIG. 4), has been constructed from the master in accordance with the teachings of the invention as set forth hereinabove, and that the template is available to computer 102.

The registration process shown in block diagram form in FIG. 5 starts, at block 501, by reading the incoming image into the exemplary image process system by, for example, utilizing scanner 101.

Computer 102 may then be used to compute a vector sum of all vectors in the gradient template (represented by the plot in FIG. 4), at each "black" point on the image to be registered as follows:

$$T = (1/N) \sum_{x,y} G(x,y) u(x,y),$$

where T is the mean vector, N is the number of black pixels in said second bitmapped image, G is the gradient vector field and u is a scalar matrix containing 1 for all black pixels in said image to be registered and 0 elsewhere, with the direction of vector T, defined as $T=t_x i + t_y j$, given by:

$$\theta = \operatorname{atan}(t_y/t_x).$$

This step of computing the aforementioned vector sum is illustrated at block 502 of FIG. 5.

It should be noted that computer 102 may be easily programmed by those skilled in the art to compute the vector sum and direction as indicated hereinabove using standard programming techniques applicable to computer systems such as the exemplary Sun Sparcststation IPC workstation referred to hereinabove.

Next, according to the embodiment of the invention being described with reference to FIG. 5 (at block 503), the image to be registered is moved one step in the direction closest to θ. For example, in a rectangular grid (where only eight single-step movements are possible), each possible step corresponds to a multiple of 45 degrees.

According to a preferred embodiment of the invention, this process is repeated (via loop 504 depicted in FIG. 5) until a sufficiently small registration error is achieved or the number of iterations exceeds a certain threshold. The test for the alignment error between the incoming image and the master being less then sum predetermined tolerance is shown at block 505 in FIG. 5.

As will be readily recognized by those skilled in the art, the test depicted at block 505 may be, for example, a sum of the square of the differences of the master pixel position values versus the pixel locations in the image to be recognized, etc.

The final block depicted in FIG. 5 (block 506), is entered when the exemplary test depicted at block 505 is successful, i.e., when the incoming image and the master are aligned.

The invention as described hereinabove with reference to form identification may, as indicated hereinbefore, be applied in image processing contexts in general, in character recognition systems, object positioning systems, etc., without departing from the spirit or scope of the invention which is the recognition that bitmap registration may be efficiently and accurately performed by utilizing the above described gradient decent technique.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

For example, those skilled in the art will recognize that a substantial speed-up can be achieved by observing that neither the gradient template nor the incoming image change during the registration process. If, during the process of registration, the same point is visited a second time, iteration can immediately be halted.

If the iteration is not halted, the image will visit the same points repeatedly, with no gain in registration accuracy. This cycle-detecting enhancement yields a two fold average improvement in registration speed with no loss of accuracy.

In view of the above it is, therefore, to be understood that the claims appended hereto are intended to cover all such modifications and variations which fall within the true scope and spirit of the invention.

What is claimed is:

1. A method for registering bitmapped images utilizing an image processing system, comprising the steps of:

(a) inputting a master bitmapped image to said image processing system;

(b) creating a template from said master by convolving said master with a Gaussian function and computing the gradient of the resulting scalar field;

(c) inputting an image to be registered with respect to said master into said image processing system; and (d) iteratively shifting the entire position of said entire image to be registered, with respect to said template, and said entire image to be registered is shifted so that all portions of said entire image as originally inputted to the image processing system are included in the shifting, where the direction of adjustment is a function of the gradient of the scalar field formed by the convolution operation used to create said template.

2. A method as set forth in claim 1 further comprising the step of terminating the registration process whenever the alignment error between said master and image to be registered is below a predetermined threshold.

3. A method as set forth in claim 1 further comprising the step of terminating the registration process whenever the number of iterations performed at said step of iteratively shifting exceeds a predetermined threshold value.

4. A method as set forth in claim 1 further comprising the step of terminating the registration process whenever the same point is visited twice as a result of performing said step of iteratively shifting.

5. A method for registering bitmapped images with corresponding master bitmapped images, comprising the steps of:

(a) constructing a registration gradient template from a master bitmapped image by applying a convolution and gradient operation thereto;

(b) computing the vector sum of all vectors in said gradient template at each black pixel on the image to be registered with said master; and (c) shifting the entire position of said entire image to be registered by one pixel in the direction of the vector sum computed at step (b) and said entire image to be registered is shifted so that all portions of said entire image as originally inputted to the image processing system are included in the shifting.

6. A method as set forth in claim 5 further comprising the step of iteratively performing said step of shifting until the alignment error between the image to be registered and said master is below a predetermined threshold.

7. A method as set forth in claim 5 further comprising the step of terminating the registration process wherever the number of iterations performed at said step of shifting exceeds a predetermined threshold value.

8. A method as set forth in claim 5 further comprising the step of terminating the registration process whenever the same point is visited twice as a result of performing said step of iteratively shifting.

9. A method as set forth in claim 5 wherein said master bitmapped image is convolved with a Gaussian function given by:

$$f(x,y) = (-e)^{(x^2+y^2)/(sigma)^2}.$$

where sigma is the standard deviation of the Gaussian.

10. A method as set forth in claim 9 wherein said registration gradient template comprises the gradient of the scalar field resulting when said master is convolved with said Gaussian function given by:

$$f(x,y) = (-e)^{(x^2+y^2)/(sigma)^2}.$$

11. A method as set forth in claim 5 wherein said step of computing further comprises the step of evaluating the equation:

$$T = (1/N) \sum_{x,y} G(x,y)u(x,y),$$

where T is the mean vector, N is the number of black pixels in said second bitmapped image, G is the gradient vector field and u is a scalar matrix containing 1 for all black pixels in said image to be registered and 0 elsewhere, with the direction of vector T, defined as $T=t_x i + t_y j$, given by:

$$\theta = \operatorname{atan}(t_y/t_x).$$

12. Apparatus for registering, with the aid of a digital computer, an incoming bitmapped image with a master bitmapped image, using a template created from said master by convolving said master with a Gaussian function and computing the gradient of the resulting scalar field, comprising:

(a) means for providing said incoming bitmapped image to said computer; and (b) means for iteratively shifting the entire position of said entire incoming bitmapped image, with respect to said template, and said entire image to be registered is shifted so that all portions of said entire image as originally inputted to the image processing system are included in the shifting, where the direction of adjustment is a function of the gradient of the scalar field formed by the convolution operation used to create said template.

13. Apparatus as set forth in claim 12 further comprising means for terminating the registration process whenever the alignment error between the incoming bitmapped image and said master is below a predetermined threshold.

14. Apparatus as set forth in claim 12 further comprising means for terminating the registration process whenever the number of iterations performed by said means for iteratively adjusting exceeds a predetermined threshold value.

15. Apparatus as set forth in claim 12 further comprising means for terminating the registration process whenever the same point is visited twice by said means for iteratively adjusting.

16. An image processing system for aligning an incoming bitmapped image with a master bitmapped image, comprising:

(a) registration means including:
  (a1) means for creating a registration gradient template from said master by applying a convolution and gradient operation thereto;
  (a2) means for computing the vector sum of all vectors in said registration gradient template at each black pixel on said incoming bitmapped image; and
  (a3) means for shifting the entire position of said entire incoming bitmapped image by one pixel in the direction of the vector sum computed by said means for computing and said entire image to be registered is shifted so that all portions of said entire image as originally inputted to the image processing system are included in the shifting; and (b) means for terminating the registration process.

17. A character recognition system operative to align an incoming bitmapped image representing a character with a master bitmapped image representing said character, comprising:

(a) registration means including:
  (a1) means for creating a registration gradient template from said master by applying a convolution and gradient operation thereto;
  (a2) means for computing the vector sum of all vectors in said registration gradient template at each black pixel on said incoming bitmapped image; and
  (a3) means for shifting the entire position of said entire incoming bitmapped image by one pixel in the direction of the vector sum computed by said means for computing and said entire image to be registered is shifted so that all portions of said entire image as originally inputted to the image processing system are included in the shifting; and (b) means for terminating the registration process.

18. An position adjustment system for aligning an incoming bitmapped representation of an object with a master bitmapped representation of said object, comprising:

(a) registration means including:
  (a1) means for creating a registration gradient template from said master by applying a convolution and gradient operation thereto;
  (a2) means for computing the vector sum of all vectors in said registration gradient template at each black pixel on said incoming bitmapped representation of an object; and
  (a3) means for shifting the entire position of said entire incoming bitmapped representation of an object by one pixel in the direction of the vector sum computed by said means for computing and said entire image to be registered is shifted so that all portions of said entire image as originally inputted to the image processing system is included in the shifting; and (b) means for terminating the registration process.

19. A method for registering bitmapped images utilizing a digital computer comprises the steps of:

(a) providing said computer with a template created from a master bitmapped image utilizing a convolution operation; and (b) utilizing said computer to iteratively shift the entire position of an entire image to be registered, with respect to the template, and said entire image to be registered is shifted so that all portions of said entire image as originally inputted to the image processing system is included in the shifting, where the direction of adjustment is a function of the gradient of the scalar field formed by the convolution operation used to create the template.

* * * * *